UNITED STATES PATENT OFFICE.

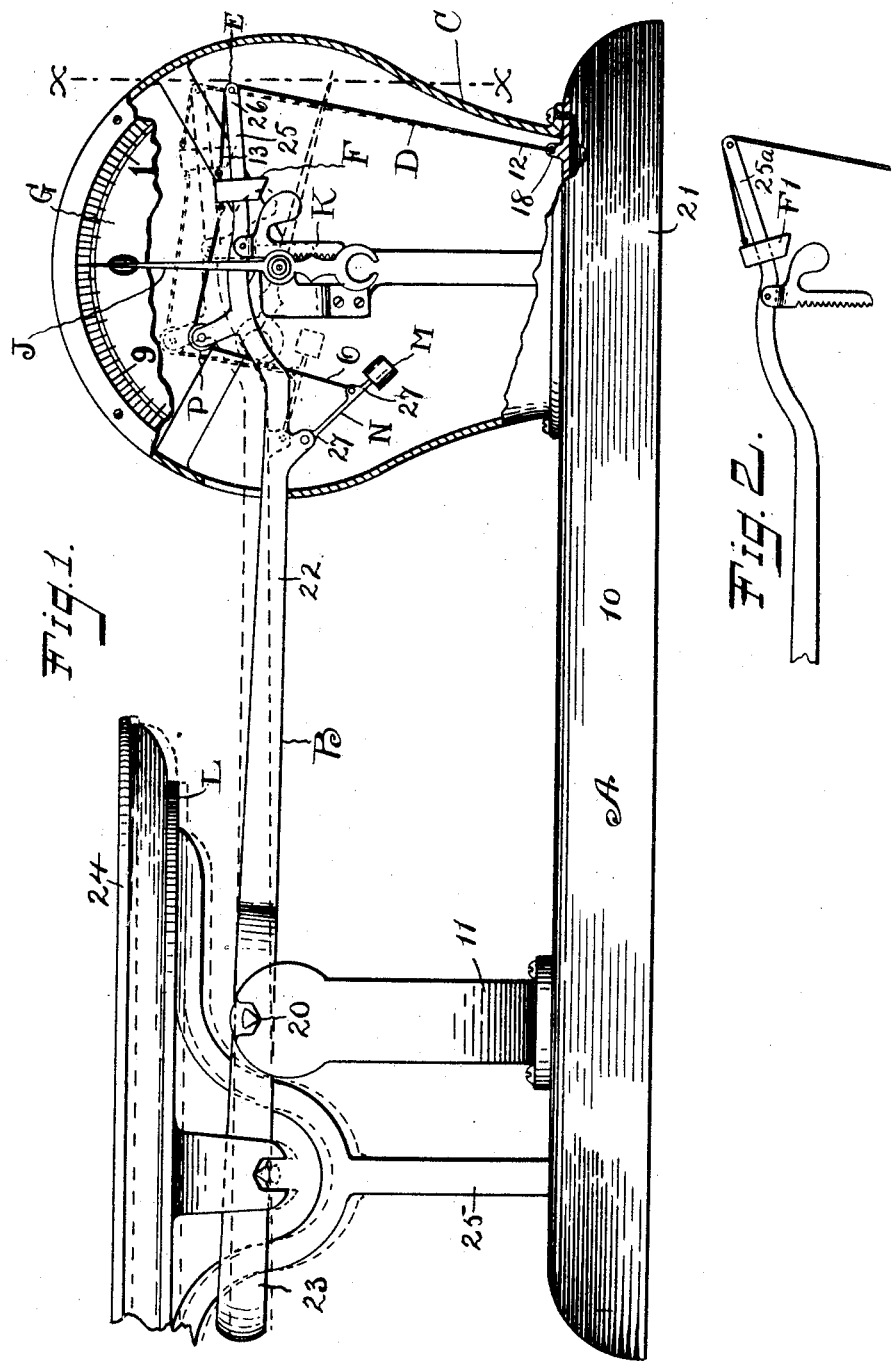

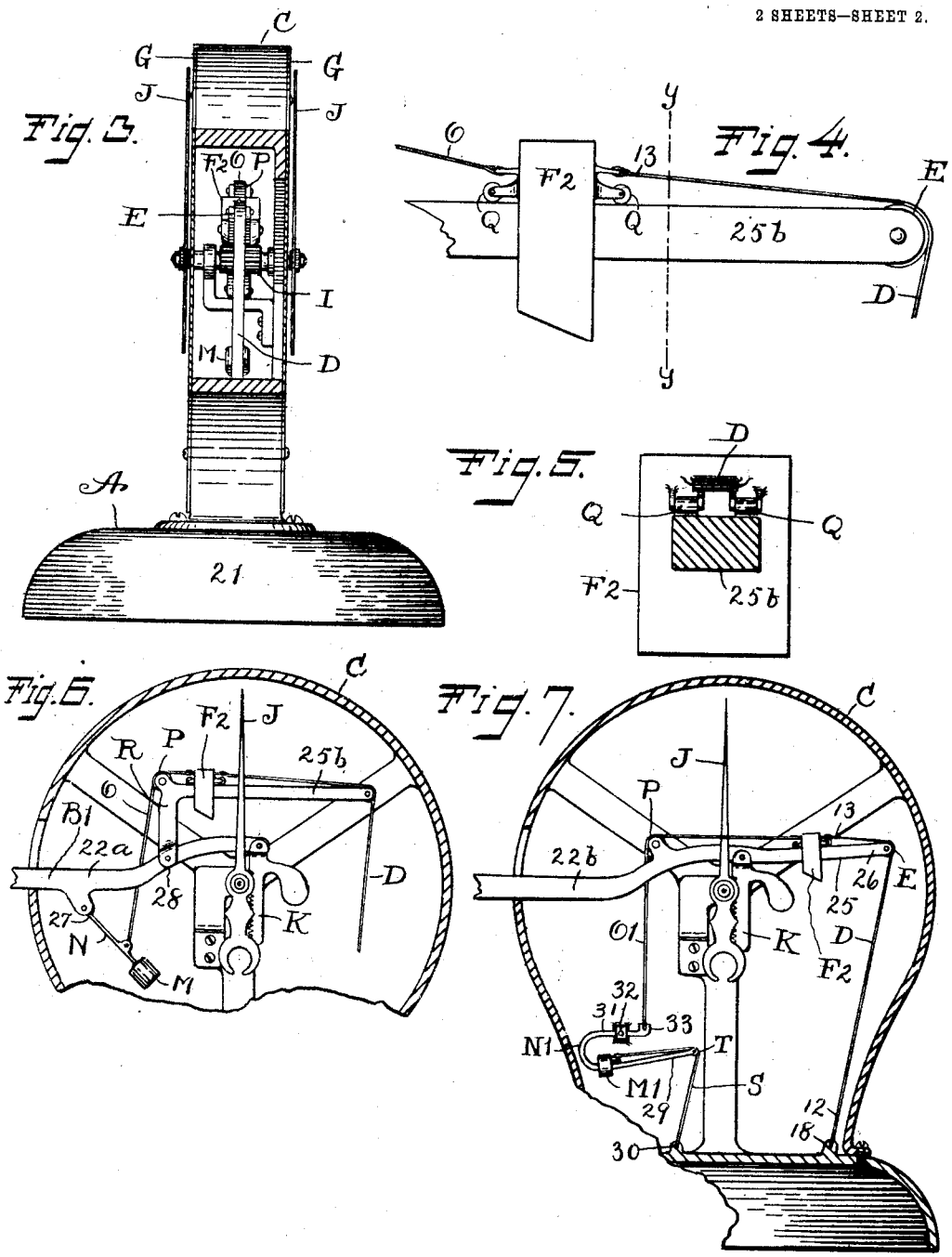

CHARLES D. BISHOP, OF NEW BRITAIN, CONNECTICUT.

BEAM-SCALE.

1,036,787.  Specification of Letters Patent.  Patented Aug. 27, 1912.

Application filed October 10, 1910. Serial No. 586,171.

*To all whom it may concern:*

Be it known that I, CHARLES D. BISHOP, a citizen of the United States, residing at New Britain, in the county of Hartford and State of Connecticut, have made certain new and useful Improvements in Beam-Scales, of which the following is a specification.

My invention relates to improvements in beam scales, and the objects of my improvements are simplicity and economy in construction and convenience and efficiency in use.

In the accompanying drawing: Figure 1 is a part sectional view and part side elevation of my improved scale, in part broken away. Fig. 2 shows a modification of one end of the scale beam. Fig. 3 is a sectional view on the line $x\ x$ of Fig. 1. Fig. 4 is a side elevation of the end of the scale beam shown in Fig. 1 with a modification of the counterbalancing weight, on an enlarged scale. Fig. 5 is a sectional view on the line $y\ y$ of Fig. 4. Fig. 6 is a side elevation of a modification of the end of the scale beam and connected parts on the same scale as Fig. 1. Fig. 7 is a similar view of another modification of the same.

A is the base of my improved scale and comprises an elongated flat structure 10 which constitutes the base proper and has projecting upward therefrom, and preferably to one side of the middle of the length an upright standard 11 which serves as a support for the knife edge bearings 20 of the said beam B and has at the end 21 at the side of the middle remote from the said standard 11 a housing and support C for indicating and operating mechanism to be described. The said scale beam B is divided by the said knife edge bearings 20 into a long arm 22 extending into the said housing C and a short arm 23 which supports a scale platform L which may be provided with a scale pan 24, and a downwardly extending arm 25 is connected by suitable links not shown with the said beam B adjacent the pivotal or rocking support 20 for the purpose of maintaining a horizontal position of the said platform L throughout the range of movement of the beam B, all of which is ordinary. The said long arm 22 of the beam B is provided with a rack K which engages with a pinion I so as to operate the index J secured to a common shaft H, so as to indicate on the dial G the weight of a load placed in the scale pan 24, all in an ordinary manner. As shown in Fig. 1, an extension of the said arm 22 beyond the said rack K constitutes a way 25 which slidably receives a counterbalancing weight F. A ribbon or band D is connected by one end 13 to the said counterbalancing weight F, passes outwardly therefrom to the outer end 26 of the said way 25 where it passes over a guide roll E and downwardly therefrom, the other end 12 being fixedly secured to the said base proper 10 as indicated at 18. A retracting weight M is mounted on the free end 27 of a lever N, the other end 27 of which is pivotally mounted to the said scale beam B, preferably normally in a pendent position at a slight angle from the vertical, a retracting ribbon or band O being secured by one end to the said lever N intermediate the ends of the same and passing over a guide roll P supported by the said beam B and extending outwardly from the said guide roll, has its other end secured to the said counterbalancing weight F. Normally the said weights F and M, connected as described, serve to maintain the said scale beam B in position of equilibrium. An upward movement of the said long arm 22 serves to move the said counterbalancing weight F outwardly along the said way 25 by means of the said ribbon or band D, and a corresponding movement is imparted to the said retracting weight M through the said ribbon O, and which condition corresponds to the effect of a load in the said scale pan 24. When the said load is removed the same retracting weight M is free to retract the said counterbalancing weight F to the normal condition or position of equilibrium. The mounting of the said retracting weight M is such that throughout its range of movement, corresponding to the range of action or capacity for the scales, the same will be in operative position to retract the said counterbalancing weight in the manner described.

In the modification shown in Fig. 2 the weight $F^1$ is supported on a way $25^a$ which is inclined upward so that the said weight will drop to its normal position by gravity when free to do so. The weight $F^2$ shown in Fig. 4 is provided with supporting rolls Q, which travel on the upper edge of the way $25^b$. The way $25^b$ shown in Fig. 6 is supported from the long arm $22^a$ of the beam $B^1$ at a point 28 intermediate the said rack and pivotal point of support 20 by means of a bent arm R, providing an increase in the range of the counterbalancing weight. The retracting weight $M^1$ shown in Fig. 7 is slidably mounted on a way 29 provided on the supporting lever $N^1$ and is moved outwardly thereon when the beam end $22^b$ moves upwardly by means of the ribbon or band S, which extends from the said weight $M^1$ over a guide roll T to a fixed point 30 below the same, the said way 29 being upwardly inclined so that the said weight $M^1$ will be returned to normal position by gravity, essentially as the said weight $F^1$ shown in Fig. 2 is returned to its normal position. As shown, the said lever $N^1$ is U shaped, comprising a lower arm constituting the said way 29 and an upper arm 31, is pivotally supported by the said upper arm 31 as shown at 32, and the said upper arm 31 has an extension outwardly directed from the said pivot 32, to the free end 33 of which is attached the retracting ribbon $O^1$, which is connected to a counterbalancing weight as is the case with the retracting ribbon O. Arranged as described, the said retracting weight $M^1$ coöperates with the counterbalancing weight so as to increase the range of the scale above what the same would be without such coöperation. It will be noted that the way 25 is straight so that the movement of the counterbalancing weight F to and fro longitudinally along the arm B is rectilinear.

As described, my improved scale comprises a beam scale that is automatic in its operation and which is accordingly particularly serviceable for use in markets and in places generally where it is desirable to avoid the handling of the counterbalancing weights in use.

I claim as my invention:

1. In a beam scale, the beam pivotally mounted, having means for receiving the load at one end and a counterbalancing weight at the other end, means responsive to the movement of the said beam, when actuated by the load, to automatically pull the said counterbalancing weight to a counterbalancing position, in combination with other means for pulling the said counterbalancing weight back to normal position upon the removal of the said load.

2. In a beam scale, the beam pivotally mounted intermediate its ends, load receiving means at one of the said ends and a counterbalancing weight having means for being moved to a counterbalancing position at the other end, and a retracting weight attached to the said counterbalancing weight and operative to retract the same and serving as coöperative means for maintaining the said counterbalancing weight in the said counterbalancing position.

3. In a beam scale having arms on each side of a pivotal support, load-receiving means on one arm, and counterbalancing means on the other arm, the said counterbalancing means comprising a weight, ribbon guiding means located on said other arm outwardly from the said weight, a ribbon secured by one end to the said weight, passing over the said guiding means and having the other end fixedly secured below the said guiding means.

4. In a beam scale having arms on each side of a fixed pivotal support, load-receiving means on one arm, counterbalancing means on the other arm comprising a sliding weight and a ribbon having one end fixedly secured and the other end attached to the said weight and serving to pull said weight along said arm in conformity to the movement of the said arm, and a retracting weight connected to the said first weight and operative to retract the same when the said pulling means is relaxed.

5. A beam scale, the beam pivotally mounted between its ends, having means for receiving the load at one end and a counterbalancing weight at the other end, means by which through the movement of said beam away from its normal position the said weight will be moved to a counterbalancing position, and retractive means operative to retract the said weight to normal position upon return of the beam to normal position.

6. In a beam scale having a beam pivotally mounted between its ends, means for receiving a load at one end, a counterbalancing weight at the other end, and having means for being moved to the counterbalancing position by the upward movement of the said other end responsive to a load on the said first end, means supported by the said beam and serving to return the said counterbalancing weight to normal position upon the removal of the said load.

CHARLES D. BISHOP.

Witnesses:
S. H. CLARKE,
NEWTON L. LOCKWOOD.